(12) United States Patent
Merritt

(10) Patent No.: US 7,753,982 B2
(45) Date of Patent: Jul. 13, 2010

(54) FILTER WITH DRAINED JACKET, SEAL INDICATOR/LOCK MEANS, AND SEAL BAFFLE

(75) Inventor: Steven J. Merritt, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 1153 days.

(21) Appl. No.: 11/357,788

(22) Filed: Feb. 17, 2006

(65) Prior Publication Data
US 2007/0193236 A1    Aug. 23, 2007

(51) Int. Cl.
*B01D 39/08* (2006.01)
*B01D 46/02* (2006.01)

(52) U.S. Cl. .................. 55/502; 55/350.1; 55/486; 55/487; 55/495; 55/498; 55/503; 55/521; 55/527; 55/528; 55/385.3; 95/273; 442/36; 96/380

(58) Field of Classification Search .......... 55/350.1, 55/486, 487, 495, 498, 502, 503, 521, 527, 55/528, 385.3; 95/273; 442/36; 96/380
See application file for complete search history.

(56) References Cited

U.S. PATENT DOCUMENTS

| | | | |
|---|---|---|---|
| 1,943,080 A | 1/1934 | Langston | |
| 1,947,066 A | 2/1934 | Sieg | |
| 1,954,881 A | 4/1934 | List | |
| 3,025,963 A | 3/1962 | Bauer | |
| 3,255,889 A | 6/1966 | Goldman et al. | |
| 3,397,518 A | 8/1968 | Rogers | |
| 3,438,588 A | 4/1969 | Steinholtz et al. | |
| 3,676,247 A | 7/1972 | Morris et al. | |
| 3,679,057 A | 7/1972 | Perez | |
| 4,252,591 A | 2/1981 | Rosenberg | |

(Continued)

FOREIGN PATENT DOCUMENTS

JP    S60-112320    7/1985

(Continued)

OTHER PUBLICATIONS

U.S. Appl. No. 10/979,401, filed Nov. 2, 2004, Brown.

(Continued)

*Primary Examiner*—Minh-Chau T. Pham
(74) *Attorney, Agent, or Firm*—Reinhart Boerner Van Deuren P.C.

(57) ABSTRACT

A filter element comprising a filter jacket, a fluted filter media, and an internal seal is provided. The filter jacket defines a filter jacket inner surface, a gravitational bottom, an upstream end, and a downstream end. The filter jacket includes a moisture release aperture disposed proximate the gravitational bottom. The fluted filter media resides within the filter jacket and defines a filter media outer surface. The fluted filter media comprises a planar sheet and a fluted material intermittently bonded together and collectively coiled to form a plurality of flutes. First and second selected ones of the plurality of flutes are closed proximate the upstream and downstream ends, respectively. The internal seal is formed between the filter jacket inner surface and the filter media outer surface. The internal seal is disposed within the filter jacket between the upstream and downstream ends. The moisture release aperture is located upstream of the internal seal.

28 Claims, 14 Drawing Sheets

U.S. PATENT DOCUMENTS

| | | |
|---|---|---|
| 4,253,228 A | 3/1981 | Easley |
| 4,257,790 A | 3/1981 | Bergquist et al. |
| 4,498,989 A | 2/1985 | Miyakawa et al. |
| 4,579,698 A | 4/1986 | Meyering et al. |
| 4,589,983 A | 5/1986 | Wydevan |
| 4,720,292 A | 1/1988 | Engel et al. |
| 4,747,944 A | 5/1988 | George |
| 4,798,575 A | 1/1989 | Siversson |
| 4,838,905 A | 6/1989 | Billiet et al. |
| 4,976,677 A | 12/1990 | Siversson |
| 4,976,857 A | 12/1990 | Solomon |
| 5,213,275 A | 5/1993 | Giesy |
| 5,238,474 A | 8/1993 | Kahlbaugh et al. |
| 5,245,897 A | 9/1993 | Arnold et al. |
| 5,338,325 A | 8/1994 | Stanelle |
| 5,346,675 A | 9/1994 | Usui et al. |
| 5,374,006 A | 12/1994 | Mheidle |
| 5,389,175 A | 2/1995 | Wenz |
| 5,435,870 A | 7/1995 | Takagaki et al. |
| 5,484,466 A | 1/1996 | Brown et al. |
| 5,543,007 A | 8/1996 | Takagaki et al. |
| 5,588,945 A | 12/1996 | Lauderbaugh |
| 5,609,711 A | 3/1997 | Miller |
| 5,685,985 A | 11/1997 | Brown et al. |
| 5,720,790 A | 2/1998 | Kometani et al. |
| 5,755,843 A | 5/1998 | Sundquist |
| 5,772,883 A | 6/1998 | Rothman et al. |
| 5,792,247 A | 8/1998 | Gillingham et al. |
| 5,820,646 A | 10/1998 | Gillingham et al. |
| 5,895,574 A | 4/1999 | Friedmann et al. |
| 5,902,364 A | 5/1999 | Tokar et al. |
| 6,022,305 A | 2/2000 | Choi et al. |
| 6,048,386 A | 4/2000 | Gillingham et al. |
| 6,179,890 B1 | 1/2001 | Ramos et al. |
| D437,402 S | 2/2001 | Gieseke et al. |
| 6,190,432 B1 | 2/2001 | Gieseke et al. |
| 6,210,469 B1 | 4/2001 | Tokar |
| 6,221,122 B1 | 4/2001 | Gieseke et al. |
| 6,235,195 B1 | 5/2001 | Tokar |
| D450,827 S | 11/2001 | Gieseke et al. |
| D450,828 S | 11/2001 | Tokar |
| 6,348,084 B1 | 2/2002 | Gieseke et al. |
| 6,348,085 B1 | 2/2002 | Tokar et al. |
| 6,350,291 B1 | 2/2002 | Gieseke et al. |
| 6,368,374 B1 | 4/2002 | Tokar et al. |
| 6,402,798 B1 | 6/2002 | Kallsen et al. |
| D460,169 S | 7/2002 | Anderson et al. |
| D461,003 S | 7/2002 | Gieseke et al. |
| 6,416,605 B1 | 7/2002 | Golden |
| D461,884 S | 8/2002 | Gieseke et al. |
| 6,436,162 B1 | 8/2002 | Wake et al. |
| 6,447,567 B1 | 9/2002 | Ehrenberg |
| D466,602 S | 12/2002 | Gieseke et al. |
| 6,511,599 B2 | 1/2003 | Jaroszyk et al. |
| 6,517,598 B2 | 2/2003 | Anderson et al. |
| 6,533,845 B2 | 3/2003 | Tokar et al. |
| D473,637 S | 4/2003 | Golden |
| 6,547,857 B2 | 4/2003 | Gieseke et al. |
| 6,599,344 B2 | 7/2003 | Tokar et al. |
| 6,610,117 B2 | 8/2003 | Gieseke et al. |
| 6,610,126 B2 | 8/2003 | Xu et al. |
| 6,610,177 B2 | 8/2003 | Tsay et al. |
| D483,459 S | 12/2003 | DeWit et al. |
| D484,584 S | 12/2003 | Anderson et al. |
| 6,673,136 B2 | 1/2004 | Gillingham et al. |
| 6,703,675 B1 | 3/2004 | Rodgers |
| 6,706,087 B1 | 3/2004 | Gebler et al. |
| 6,743,317 B2 | 6/2004 | Wydeven |
| 6,746,518 B2 | 6/2004 | Gieseke et al. |
| 6,783,565 B2 | 8/2004 | Gieseke et al. |
| 6,797,027 B2 * | 9/2004 | Stenersen et al. .......... 55/350.1 |
| D497,202 S | 10/2004 | Carter et al. |
| 6,851,569 B2 | 2/2005 | Conti et al. |
| 6,852,141 B2 | 2/2005 | Bishop et al. |
| 6,878,190 B1 | 4/2005 | Xu et al. |
| D506,539 S | 6/2005 | Bishop et al. |
| 6,946,012 B1 | 9/2005 | Miller et al. |
| 6,959,819 B2 | 11/2005 | Moscaritolo et al. |
| 6,960,245 B2 | 11/2005 | Tokar et al. |
| 6,966,940 B2 | 11/2005 | Krisko et al. |
| 6,974,490 B2 * | 12/2005 | Gillingham et al. .......... 55/486 |
| 6,994,744 B2 | 2/2006 | Tokar et al. |
| 6,997,968 B2 | 2/2006 | Xu et al. |
| 7,001,450 B2 | 2/2006 | Gieseke et al. |
| 7,008,465 B2 | 3/2006 | Graham et al. |
| 7,008,467 B2 | 3/2006 | Krisko et al. |
| 7,090,712 B2 | 8/2006 | Gillingham et al. |
| 7,179,317 B2 | 2/2007 | Chung et al. |
| 7,211,124 B2 | 5/2007 | Gieseke et al. |
| 7,252,704 B2 | 8/2007 | Tokar et al. |
| 7,255,300 B2 | 8/2007 | Johnston |
| 7,270,692 B2 * | 9/2007 | Gillingham et al. .......... 55/486 |
| 7,282,075 B2 | 10/2007 | Sporre et al. |
| 7,303,604 B2 | 12/2007 | Gieseke et al. |
| 7,316,723 B2 | 1/2008 | Chung et al. |
| 7,318,851 B2 | 1/2008 | Brown et al. |
| 7,318,852 B2 | 1/2008 | Chung et al. |
| 7,323,029 B2 | 1/2008 | Engelland et al. |
| 7,338,544 B2 | 3/2008 | Sporre et al. |
| 7,351,270 B2 | 4/2008 | Engelland et al. |
| 7,393,375 B2 | 7/2008 | Xu et al. |
| 7,396,376 B2 | 7/2008 | Schrage et al. |
| 7,442,220 B2 * | 10/2008 | Pearson et al. ............... 55/418 |
| 7,491,254 B2 * | 2/2009 | Krisko et al. .................. 55/337 |
| 2002/0100262 A1 | 8/2002 | Gieseke et al. |
| 2002/0185008 A1 | 12/2002 | Anderson et al. |
| 2003/0089654 A1 | 5/2003 | Janiek |
| 2003/0121845 A1 | 7/2003 | Wagner et al. |
| 2003/0146149 A1 | 8/2003 | Binder et al. |
| 2003/0182909 A1 | 10/2003 | Gieseke et al. |
| 2003/0217534 A1 | 11/2003 | Krisko et al. |
| 2003/0226800 A1 | 12/2003 | Brown et al. |
| 2004/0071940 A1 | 4/2004 | Frey |
| 2004/0118771 A1 | 6/2004 | Schukar et al. |
| 2005/0029184 A1 | 2/2005 | Desmarais |
| 2005/0076623 A1 * | 4/2005 | Stenersen et al. .......... 55/350.1 |
| 2005/0229561 A1 | 10/2005 | Nepsund et al. |
| 2005/0252182 A1 | 11/2005 | Golden et al. |
| 2006/0086075 A1 * | 4/2006 | Scott et al. .................... 55/498 |
| 2006/0091061 A1 | 5/2006 | Brown |
| 2006/0091064 A1 | 5/2006 | Brown et al. |
| 2006/0091066 A1 | 5/2006 | Driml et al. |
| 2006/0091084 A1 | 5/2006 | Merritt et al. |
| 2006/0101795 A1 | 5/2006 | Krisko et al. |
| 2006/0151655 A1 | 7/2006 | Johnston |
| 2006/0163150 A1 | 7/2006 | Golden et al. |
| 2006/0196359 A1 * | 9/2006 | Gillingham et al. .......... 95/273 |
| 2007/0039296 A1 | 2/2007 | Schrage et al. |
| 2007/0175194 A1 | 8/2007 | Nepsund et al. |
| 2007/0186528 A1 * | 8/2007 | Wydeven et al. .............. 55/498 |
| 2007/0193236 A1 | 8/2007 | Merritt |
| 2007/0199285 A1 | 8/2007 | Gieseke et al. |
| 2007/0234903 A1 | 10/2007 | Xu et al. |
| 2007/0261374 A1 | 11/2007 | Nelson et al. |
| 2007/0289265 A1 | 12/2007 | Coulonvaux et al. |
| 2008/0010959 A1 | 1/2008 | Gillingham et al. |
| 2008/0016832 A1 | 1/2008 | Krisko et al. |
| 2008/0022641 A1 | 1/2008 | Engelland et al. |
| 2008/0060329 A1 * | 3/2008 | Brown et al. .................. 55/498 |
| 2008/0066434 A1 | 3/2008 | Kuempel et al. |
| 2008/0086990 A1 | 4/2008 | Kuempel et al. |
| 2008/0110142 A1 * | 5/2008 | Nelson et al. ................. 55/357 |
| 2008/0110822 A1 | 5/2008 | Chung et al. |
| 2008/0115470 A1 | 5/2008 | Kuempel et al. |

| | | | |
|---|---|---|---|
| 2008/0115758 A1 | 5/2008 | Engelland et al. | |
| 2008/0209874 A1 | 9/2008 | Gieseke et al. | |
| 2008/0216654 A1 | 9/2008 | Wagner et al. | |
| 2008/0250763 A1 | 10/2008 | Widerski et al. | |
| 2008/0250766 A1 | 10/2008 | Schrage et al. | |
| 2008/0282890 A1 * | 11/2008 | Rocklitz et al. | 95/273 |

FOREIGN PATENT DOCUMENTS

| | | |
|---|---|---|
| JP | S60-124622 | 8/1985 |
| JP | 63-122617 | 6/1988 |
| JP | HEI 2-31131 | 8/1990 |
| WO | WO 2005/058461 A1 | 6/2005 |
| WO | WO 2005/077487 A1 | 8/2005 |
| WO | WO 2005/082484 A1 | 9/2005 |
| WO | WO 2005/123222 A1 | 12/2005 |
| WO | WO 2006/014941 A2 | 2/2006 |
| WO | WO 2006/017790 A1 | 2/2006 |
| WO | WO 2006/076456 A1 | 7/2006 |
| WO | WO 2006/076479 A1 | 7/2006 |
| WO | WO 2006/093960 A2 | 9/2006 |
| WO | WO 2007/009039 A1 | 1/2007 |
| WO | WO 2007/044677 A1 | 4/2007 |
| WO | WO 2007/056589 A2 | 5/2007 |
| WO | WO 2007/145939 A2 | 12/2007 |
| WO | WO 2008/045325 A2 | 4/2008 |
| WO | WO 2008/095196 A1 | 8/2008 |
| WO | WO 2008/098185 A1 | 8/2008 |
| WO | WO 2008/106375 A2 | 9/2008 |

OTHER PUBLICATIONS

U.S. Appl. No. 11/355,064, filed Feb. 15, 2006, Wydeven et al.
U.S. Appl. No. 11/634,647, filed Dec. 6, 2006, Merritt et al.
U.S. Appl. No. 12/164,974, filed Jun. 30, 2008, Merritt et al.
U.S. Appl. No. 12/164,987, filed Jun. 30, 2008, Merritt et al.

* cited by examiner

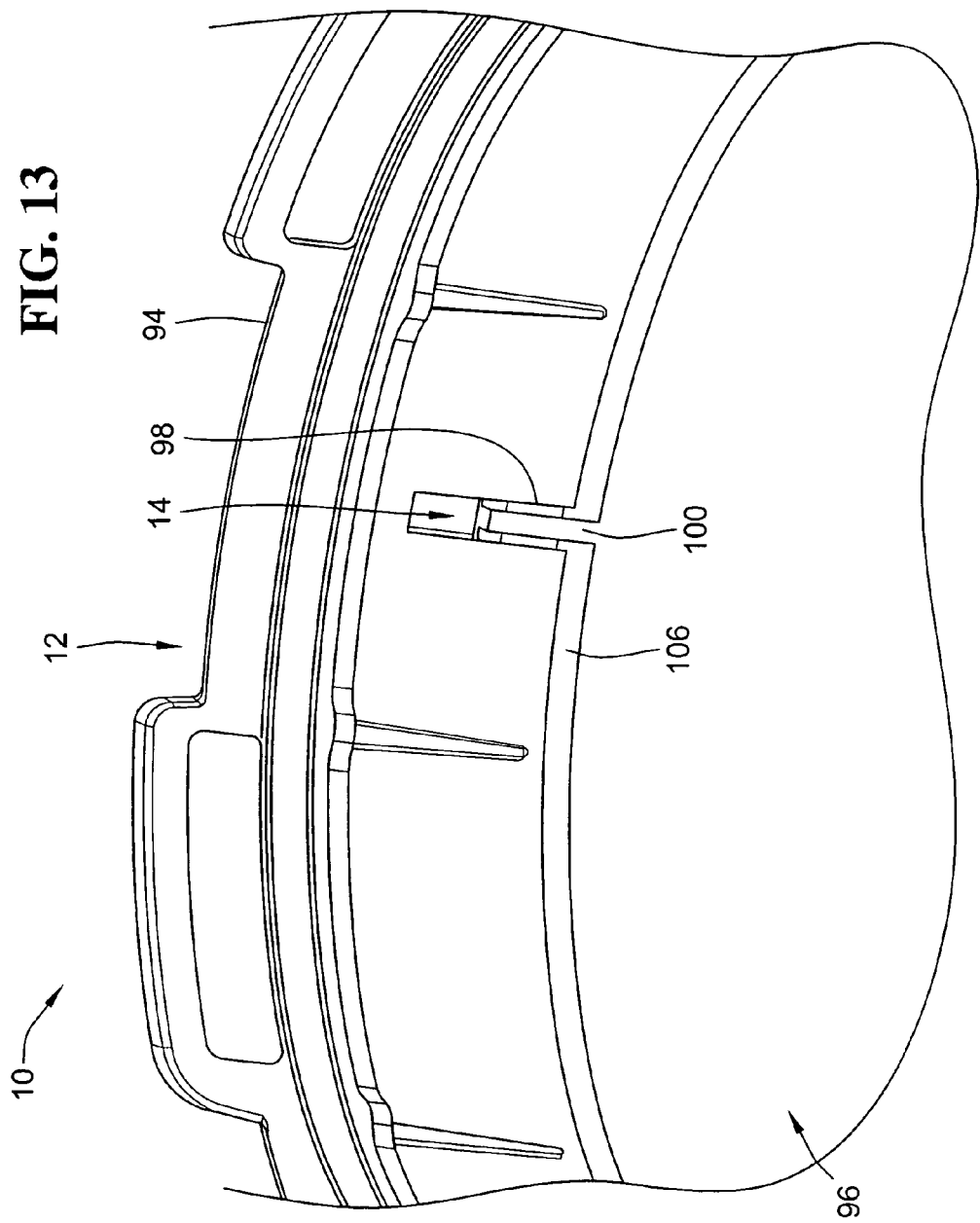

FILTER WITH DRAINED JACKET, SEAL INDICATOR/LOCK MEANS, AND SEAL BAFFLE

FIELD OF THE INVENTION

This invention generally relates to filter elements and, more particularly, to the jackets and/or seals of such filter elements.

BACKGROUND OF THE INVENTION

Gas streams often carry particulate material therein. In many instances, it is desirable to remove some or all of the particulate material from a gas flow stream. For example, air intake streams to engines for motorized vehicles or power generation equipment, gas streams directed to gas turbines, and air streams to various combustion furnaces, often include particulate material therein. The particulate material, should it reach the internal workings of the various mechanisms involved, can cause damage thereto. It is therefore preferred, for such systems, to remove the particulate material from the gas flow upstream of the engine, turbine, furnace or other equipment involved. A variety of air filter or gas filter arrangements have been developed for particulate removal.

Conventional filter elements will typically employ either a pleated filter media, a depth filter media, or a fluted filter media.

Various examples of filter elements employing a fluted filter media are illustrated in U.S. Pat. No. 6,190,432 to Gieseke, et al., U.S. Pat. No. 5,820,646 to Gillingham, et al., U.S. Pat. No. 3,025,963 to Bauer, and U.S. Pat. No. 4,589,983 to Wydevan, each of which is incorporated herein by this reference. The '646 and '983 patents illustrate, for example, filter elements with an integrally formed impervious outer skin with axial flow therethrough. Improvements to fluted filter arrangements are disclosed herein.

Various examples of pleated filter elements are disclosed, for example, in U.S. Pat. No. 6,447,567 to Ehrenberg, U.S. Pat. No. 5,484,466 to Brown, et al., U.S. Pat. No. 5,238,474 to Kahlbaugh, et al., and U.S. Pat. No. 4,720,292 to Engel, et al., each of which is incorporated herein by this reference. As illustrated in each of these aforementioned patents (for both fluted and pleated filter patents), filter elements will typically incorporate a form of an external seal that is adapted to seal the filter element against a housing, mounting base or duct, into which the filter is mounted. As is exemplified by these patents, it is also known to incorporate a foamed urethane seal to provide an external seal. Improvements to such seal arrangements are also disclosed herein.

BRIEF SUMMARY OF THE INVENTION

It is an objective according to one aspect of the present invention to better ensure water or other such fluid is not trapped in filter elements, without having to rely on independent engine or filter duct hardware and while at the same time jacketing the filter element.

It is another objective according to another aspect of the present invention to provide one or more structures for achieving more reliable seal formation on filter elements.

Other objectives relate to practicality and economy of manufacturing a reliable and practical filter element.

In accordance with the first objective, one aspect of the present invention is directed toward a jacketed and drained fluted filter element. According to this aspect, a filter element comprises a filter jacket with a moisture release aperture, a fluted filter media, and an internal seal. The filter jacket defines a filter jacket inner surface, an upstream end, and a downstream end. The moisture release aperture is formed through the outer annular and axially extending wall of the jacket to provide a means for excess water or other fluid to escape. The fluted filter media resides within the filter jacket and defines a filter media outer surface. The fluted filter media comprises a plurality of flutes where some of the flutes are closed proximate the upstream end and some of the flutes are closed proximate the downstream end. The internal seal is formed between the filter jacket inner surface and the filter media outer surface to prevent short circuiting of unfiltered fluid. The moisture release aperture is located upstream of the internal seal.

In accordance with the second objective, another aspect of the present invention is directed toward a discontinuous flange that not only engages a seal (e.g. in a preferred embodiment capping the formation of a foamed urethane seal material), but also provides one or more intermittent gaps to provide a means for locking the seal and/or providing an indication of good seal formation. A filter element according to this aspect includes filter media adapted to filter fluid passing from an inlet face of the filter media to an outlet face of the filter media. A sleeve is mounted to the filter media and includes a generally annular seal support member and a discontinuous annular flange. The flange includes at least one aperture formed therein. A seal comprised of suitable seal material is formed on the seal support member. The seal has an annular sealing surface adapted to form a seal against an appropriate housing/duct when in use. The seal engages the discontinuous flange with a portion projecting at least partially into the at least one gap.

Also, in accordance with the second objective, another aspect of the present invention is directed toward better controlling the free rise of seal material on a filter element utilizing a baffle built into the filter element. According to this aspect, a filter element includes a filter media adapted to filter fluid passing from an inlet face of the filter media to an outlet face of the filter media. A sleeve is mounted to the fluted filter media. The sleeve includes a generally annular seal support member and a generally annular baffle having surface means such as a canted guide face that faces said seal support member for directing a free rise of a foamed seal material. A seal is formed on the seal support member with the foamed seal material, the foamed seal material having a free rise surface proximate the annular baffle.

While the invention is particularly applicable to fluted filter applications and axial flow type filters, various aspects of the invention can be employed with other types of fluted filter media.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 13 is a cutaway perspective view highlighting the engagement of an alignment notch and an alignment rib from the two piece filter jacket of FIG. 12.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
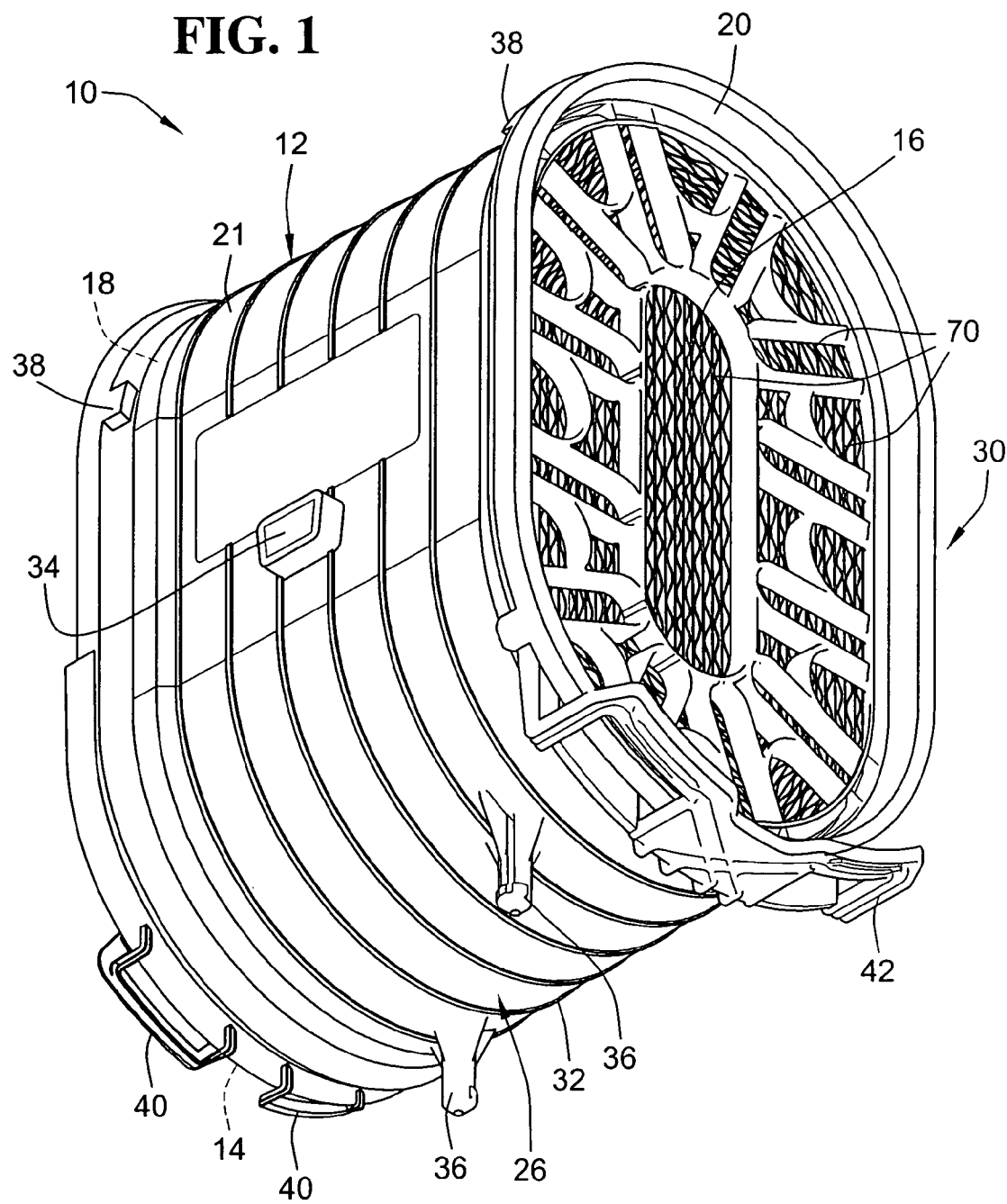
FIG. 1 is a perspective view of an exemplary embodiment of a filter element including a fluted filter media constructed in accordance with the teachings of the present invention.

Referring to FIG. 1, a filter element 10 that can be used to, for example, filter air entering an engine is illustrated. This filter element 10 is adapted to be installed inline between upstream and downstream ducts, thus forming an intermediate section of the duct between upstream and downstream sections. However, it will be appreciated that the present invention may also be utilized or otherwise incorporated into filters which may be installed and contained in filter housings.

Figure 2:
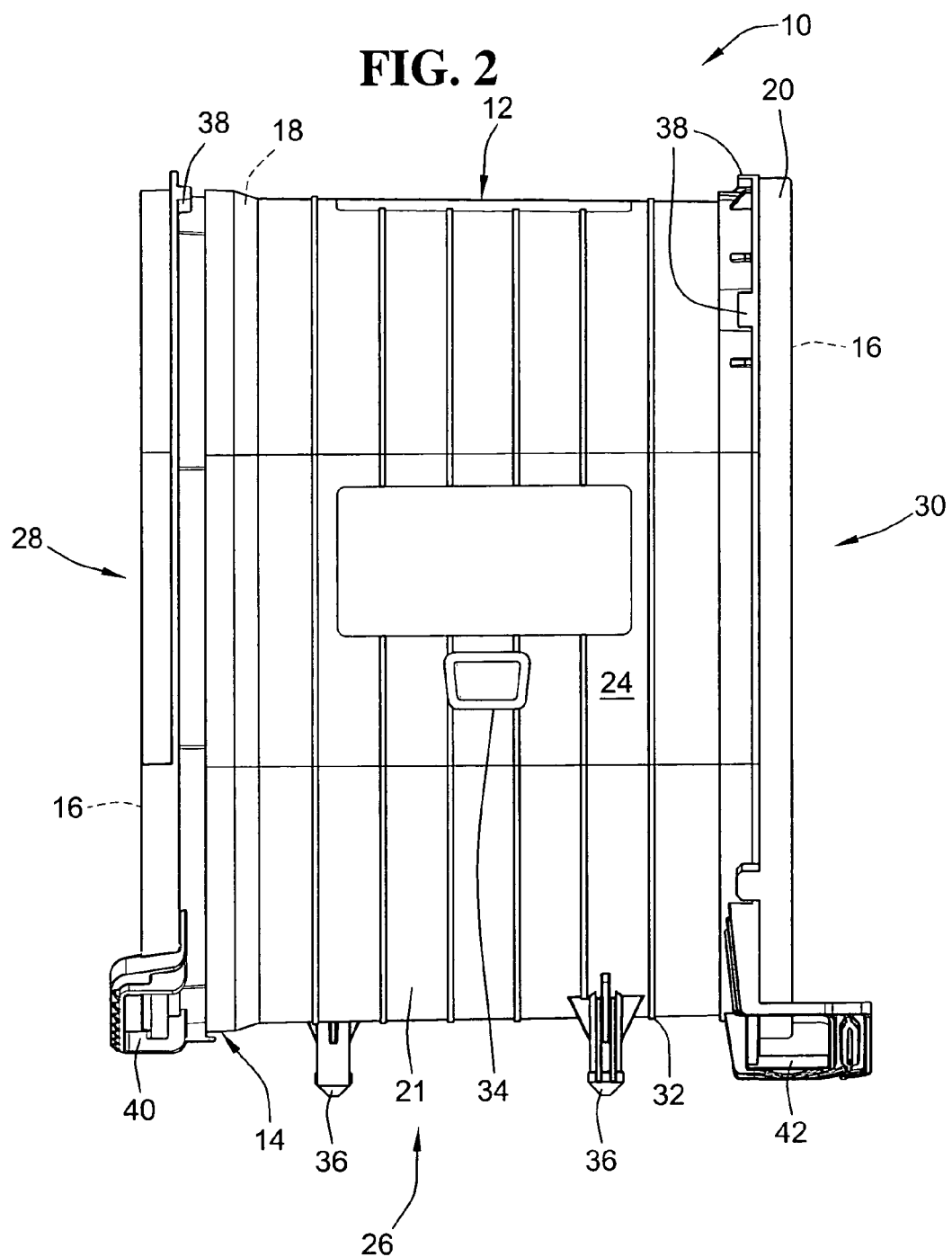
FIG. 2 is a side elevation view of the filter element of FIG. 1.

As illustrated in FIGS. 1 and 2, the filter element 10 comprises a filter jacket 12. The filter jacket 12 provides the support structure for the filter element 10 and associated structures for mounting the filter element. The jacket 12 preferably includes a moisture release aperture 14 to provide for drainage, as to be discussed in further detail below. The filter element 10 also includes a suitable filter media pack which may take the form of fluted filter media 16 (or other appropriate type of media such as those described above), an internal seal 18 formed between the jacket and the filter media, and an external seal 20.

Figure 3:
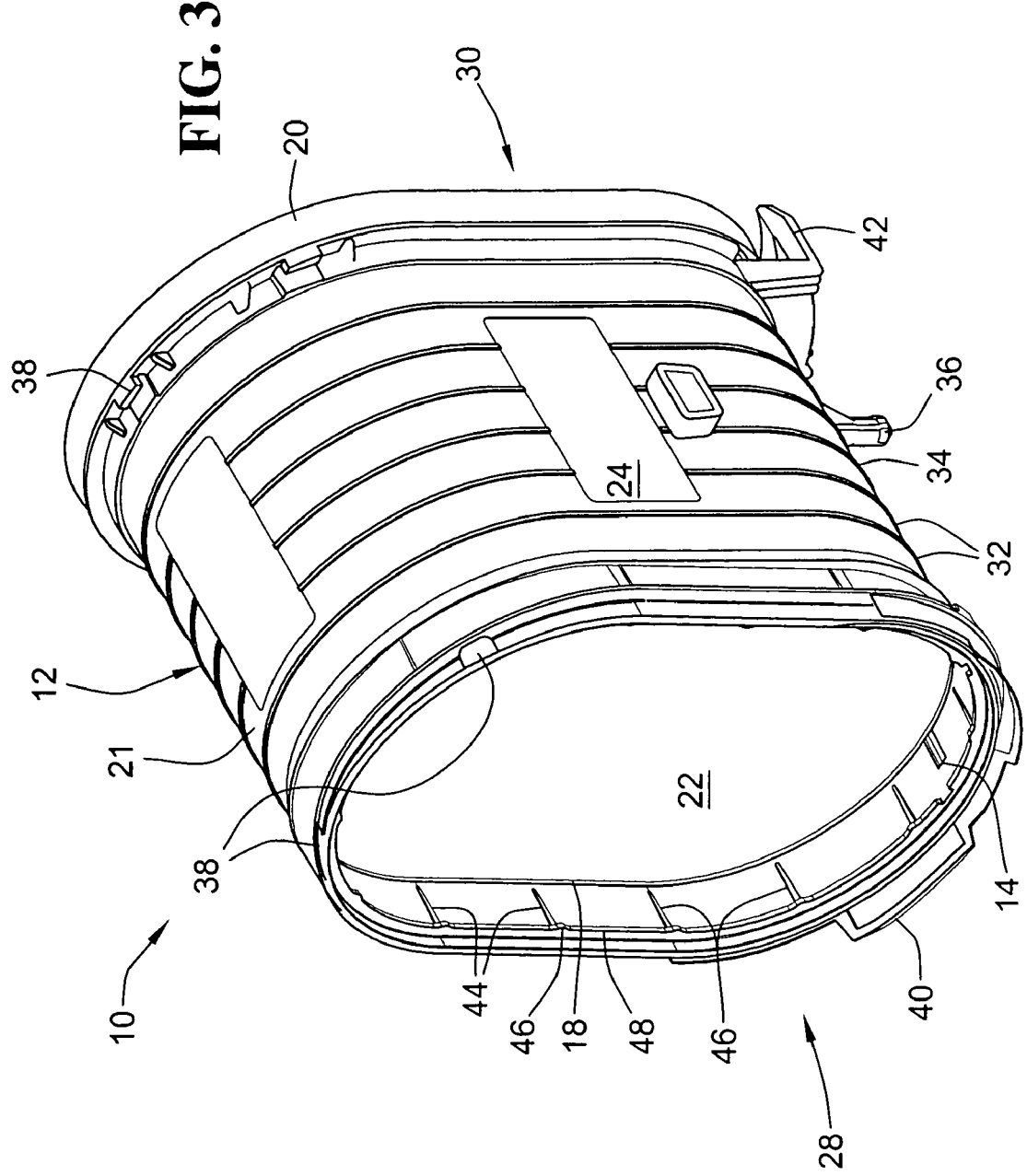
FIG. 3 is a perspective view of the filter element of FIG. 1 when viewed from an alternate vantage point and when the fluted filter media has been removed.
Figure 5:
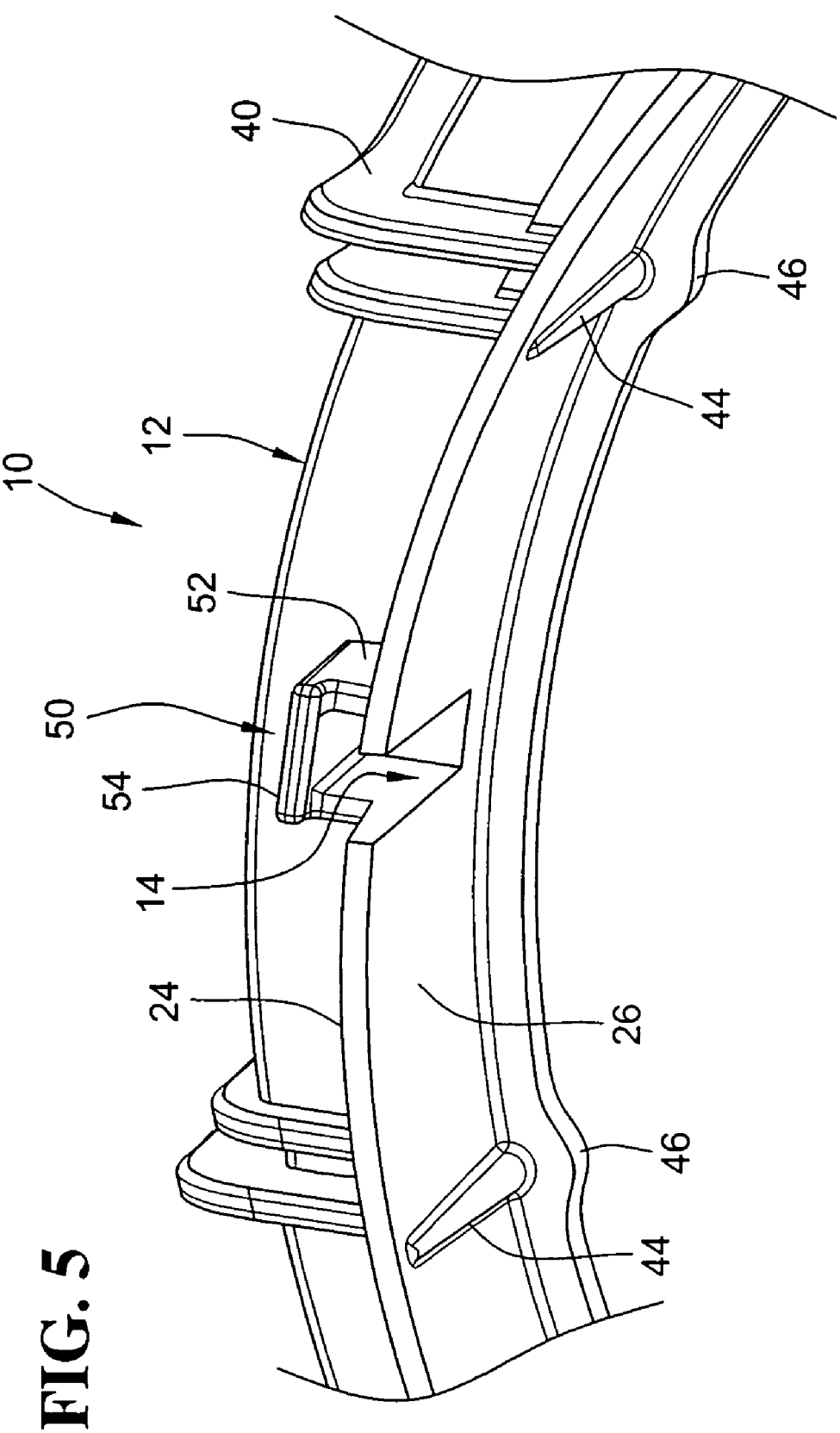
FIG. 5 is a cut away portion of the filter element of FIG. 1 illustrating the moisture release aperture shown in FIG. 4 from a different vantage point.
Figure 12:
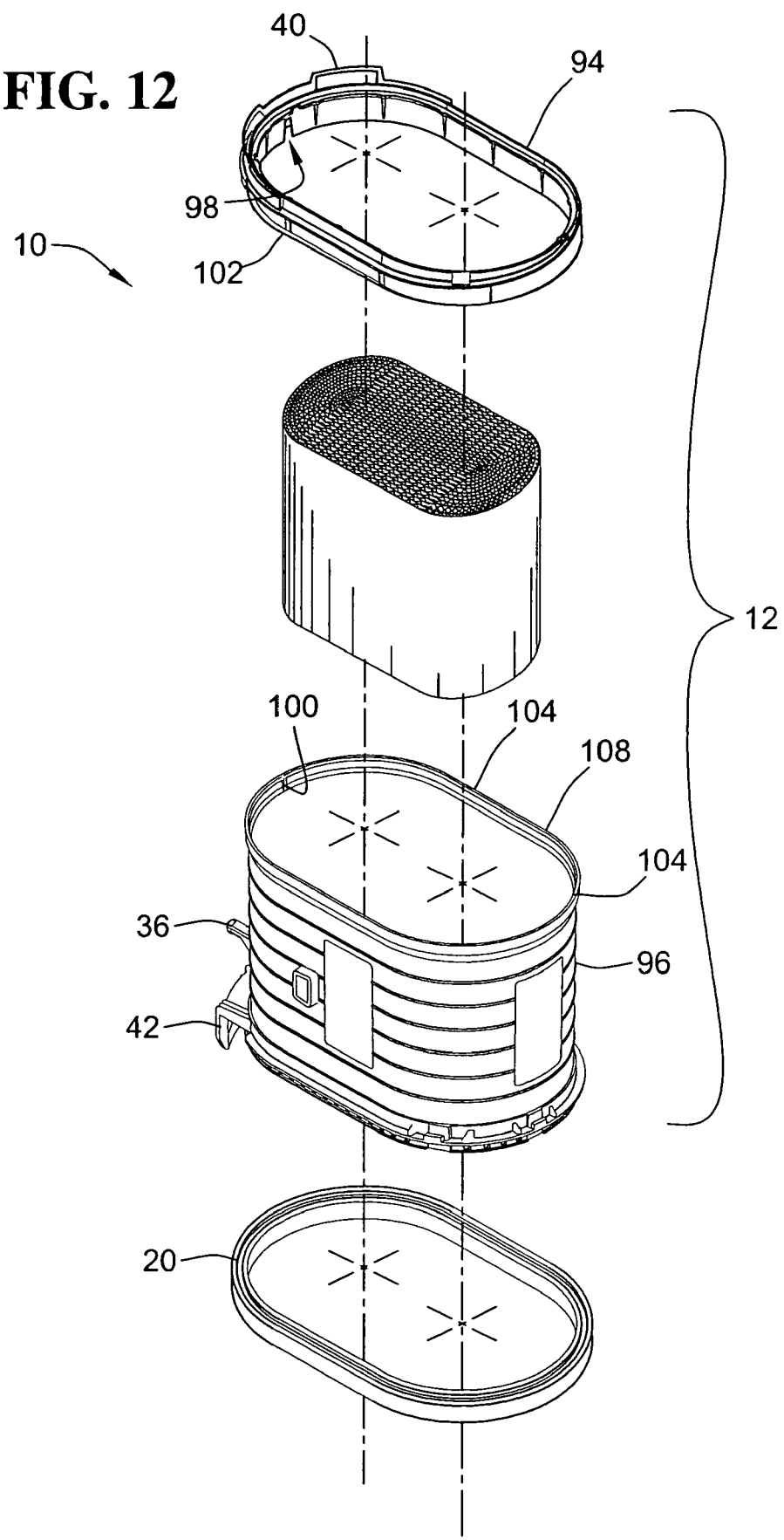
FIG. 12 is an exploded view of a two piece filter jacket for use in forming the filter element of FIG. 1.

Turning first to details of the jacket 12, and as best shown in FIGS. 3 and 5 (showing the jacket without filter media installed), the filter jacket 12 generally comprises an axially-extending annular wall 21 defining a filter jacket inner surface 22, a filter jacket outer surface 24, a gravitational bottom 26, an upstream end 28, and a downstream end 30. While the filter jacket 12 can be formed from a variety of materials, the jacket is preferably molded from relatively rigid supportive plastic material. While the jacket 12 may be formed of a single component, preferably the jacket is constructed from multiple component pieces fit together such as a first sleeve 94 and a second sleeve 96 as shown in FIG. 12. Each sleeve 94 includes an annular wall portion which collectively form the overall annular wall 21 of the filter jacket 12. In the illustrated embodiment, the filter jacket is fluid impervious downstream of the internal seal 18 and fluid permeable upstream of the internal seal by virtue of the moisture release aperture 14. Thus as a whole, the filter jacket 12 is pervious by virtue of the moisture release aperture 14, while at the same time preventing unfiltered contaminated air from reaching the clean side outlet. Also, while the filter jacket 12 is illustrated as generally oval in shape when viewed from either the upstream end 30 or downstream end 32, the filter jacket is capable of having a variety of different configurations, depending upon the shape and size of the housing or duct for which the filter element is installed. Preferably, and to maximize the amount of filtering capacity contained in the jacket, the shape of the jacket 12 conforms to the shape of the filter media 16. The filter element 12 and filter media 16 are configured to provided for axial flow through the element (e.g., along the center axis of the fluted filter media 16 around which the fluted filter media is coiled).

The filter jacket outer surface 24 can include one or more of a plurality of axially spaced apart circumferential strengthening ribs 32, bosses 34, 36 adapted to couple to a supports in an engine (not shown), and protrusions 38 adapted to receive and support clamps on a duct and/or the engine. One or more of these structures serve to locate the filter element 10 relative to an engine or such application and as such provide a means to locate the moisture release aperture 14 proximate the gravitational bottom to facilitate drainage of all or most of water that could potentially enter the filter (e.g., due to condensation, rain or snow).

The filter jacket 12 may also include one or more strengthening rib networks 40, 42 disposed proximate upstream and downstream ends 28, 30, respectively, of the filter jacket 12. The rib networks 40, 42 are incorporated into and onto the filter jacket to provide additional strength, to assist in guiding and/or installing the filter element in a vehicle, and the like.

Referring to FIGS. 3, 5 and 12, the filter jacket 12 provides one or more means to center and/or assist installation of the fluted filter media 16 between the first and second sleeves 94, 96, such as camming ribs or a conical guide wall 108. More specifically the first sleeve 94 includes a plurality of axially extending protrusions 44 defined along the inner surface 22 that begin proximate the upstream end 28 and progress toward the downstream end 30. These axial protrusions 44 have angled inner cam surfaces that help to align and center the filter media 16 (FIG. 1) when the filter media is inserted into the open end of the first sleeve. The first sleeve 94 also includes radially inwardly projecting protrusions 46 to serve as stop abutments to position the end face of the fluted filter media 16. These protrusions 46 preferably extend from a radially inwardly projecting flange 48 and are aligned almost atop and slightly inward of the axial protrusions 44. The flange 48 and the projections 46 are adapted to maintain the filter media 16 securely within the filter jacket 12.

The second sleeve 96 also similarly includes a centering and installation assistance means which is illustrated as the conical guide wall 108. As a coiled pack of fluted filter media 16 is axially inserted into the second sleeve 96 the conical guide wall 108 will engage the fluted filter media centering it and positioning it coaxially within the filter jacket 12.

In the illustrated embodiment and as shown best in FIG. 12, the first sleeve 94 is installed over the inlet end of the fluted filter media 16, while the second sleeve 96 is installed over the outlet end of the fluted filter media 18. As illustrated, the first sleeve 94 includes an alignment notch 98 and the second sleeve includes an alignment rib 100. The alignment notch 98 and alignment rib 100 are employed to mate and thereby coaxially and angularly align the first sleeve 94 and the second sleeve 96. In the preferred embodiment, the alignment notch 98 of the first sleeve 94 also serves as the moisture release aperture 14. The alignment rib 100 only projects partially into the alignment notch 98 when the two sleeves 94, 96 are fully abutted to leave a sizeable open space to provide for the moisture release aperture 14, and thereby facilitate drainage of water from the filter element. It is an advantage of placing the moisture release aperture 14 on the top sleeve 94 that the moisture release aperture 14 is reliably located upstream of the inner seal 18.

To facilitate assembly of the jacket 12, the first sleeve 94 defines an insertion end 102 while the second sleeve includes a correspondingly sized flared out receptacle portion 104. When the two sleeves 94, 96 are mated, the end 102 is telescopically received within the flared out receptacle portion 104 as shown in FIG. 13. The two sleeves 94, 96 are urged together until the end 102 engages one or both of the flanges 52 that form a part of the moisture release aperture 14, and/or bottoms out on the leading edge of the conical guide wall 108. Because the engagement of the two sleeves 94, 96 does not interrupt or close off the moisture release aperture 14, fluid disposed within the filter jacket 12 is still able to freely flow through the moisture release aperture 14 when two sleeves 94, 96 are joined.

Figure 7:
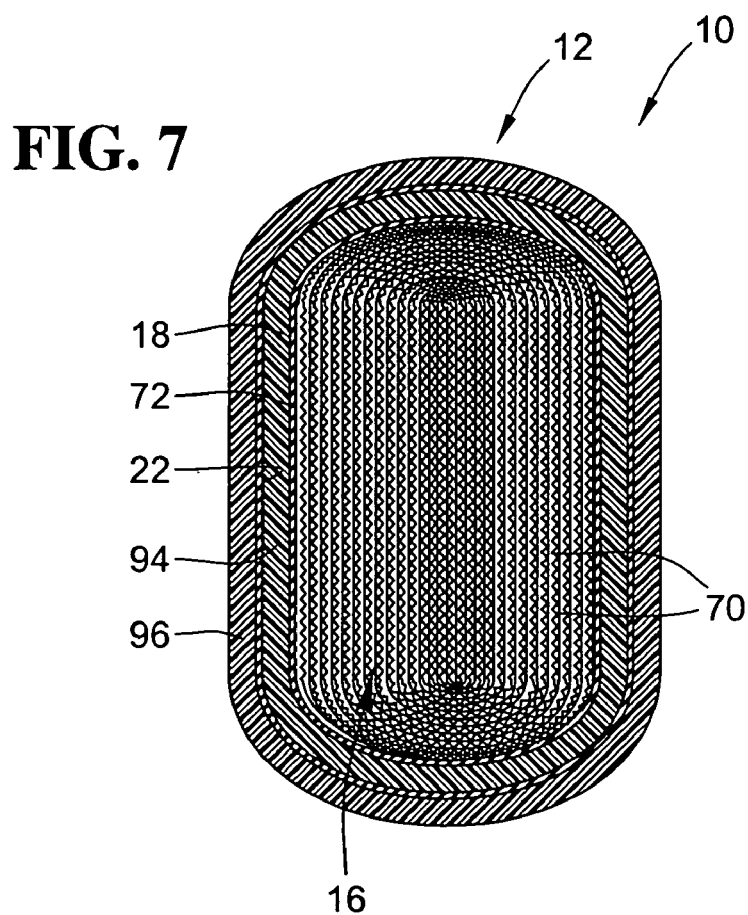
FIG. 7 is a cross sectional view of the filter element of FIG. 1 taken along an internal seal within the filter element.

The internal seal 18 is generally disposed inside the filter jacket 12 between the upstream end 28 and the downstream end 30. In a preferred embodiment, the internal seal 18 is circumferential and disposed closest to the upstream end 28 (FIG. 2). As depicted in FIG. 7, which illustrates a cross section of the filter jacket 12 taken about the internal seal 18, the internal seal is interposed between and preferably sealingly engages each of the filter jacket inner surface 22 and a filter media outer surface 72. One advantageous way to form the inner seal 18 is to dispense a continuous bead of sealing adhesive into the flared out receptacle portion 104, after the fluted filter media 16 has been installed and located in the second sleeve 96 (but without the first sleeve mounted).

The combination of the fluted filter media 16 and the second sleeve 96 provide for a continuous annular groove that provides a receptacle for receipt of the bead of sealing adhesive (which is somewhat viscous fluid in the uncured state). This bead of adhesive is sufficiently thick enough that it engages and fully seals against the entire circumference and perimeter of both the inner wall of the jacket 12 (and more specifically the flared out receptacle portion of the second sleeve 16), as well as outer surface of the fluted filter media pack 16. As a result, it forms the inner seal 18 once the adhesive dries and cures to prevent short-circuiting of unfiltered fluid from the upstream to the downstream end through the filter element.

While the two sleeves 94, 96 of the jacket 12 can be held together by a friction fit or other appropriate coupling, preferably the two sleeves 94, 96 are integrally bonded by the internal seal 18 together to form the jacket 12. Shortly after the continuous bead of sealing adhesive is dispensed into the groove (formed between second sleeve 96 and the fluted filter media 16), the first sleeve 94 is telescopically inserted into the second sleeve 96 and over the fluted filter media 16 such that it engages the adhesive to bond the sleeve components together. By pushing and pressurizing the adhesive into void areas, this construction also better ensures complete circumferential contact between the inner wall of the jacket to more reliably provide for the inner seal 18. The internal seal 18 is preferably formed from adhesive such as urethane or glue, but may comprise other suitable seal adhesive material to provide both for a sealing and bonding features. With this construction of the disclosed embodiment, a single bead of adhesive thus provides for two separate functions of preventing short-circuiting of fluid and also bonding components together.

Figure 4:
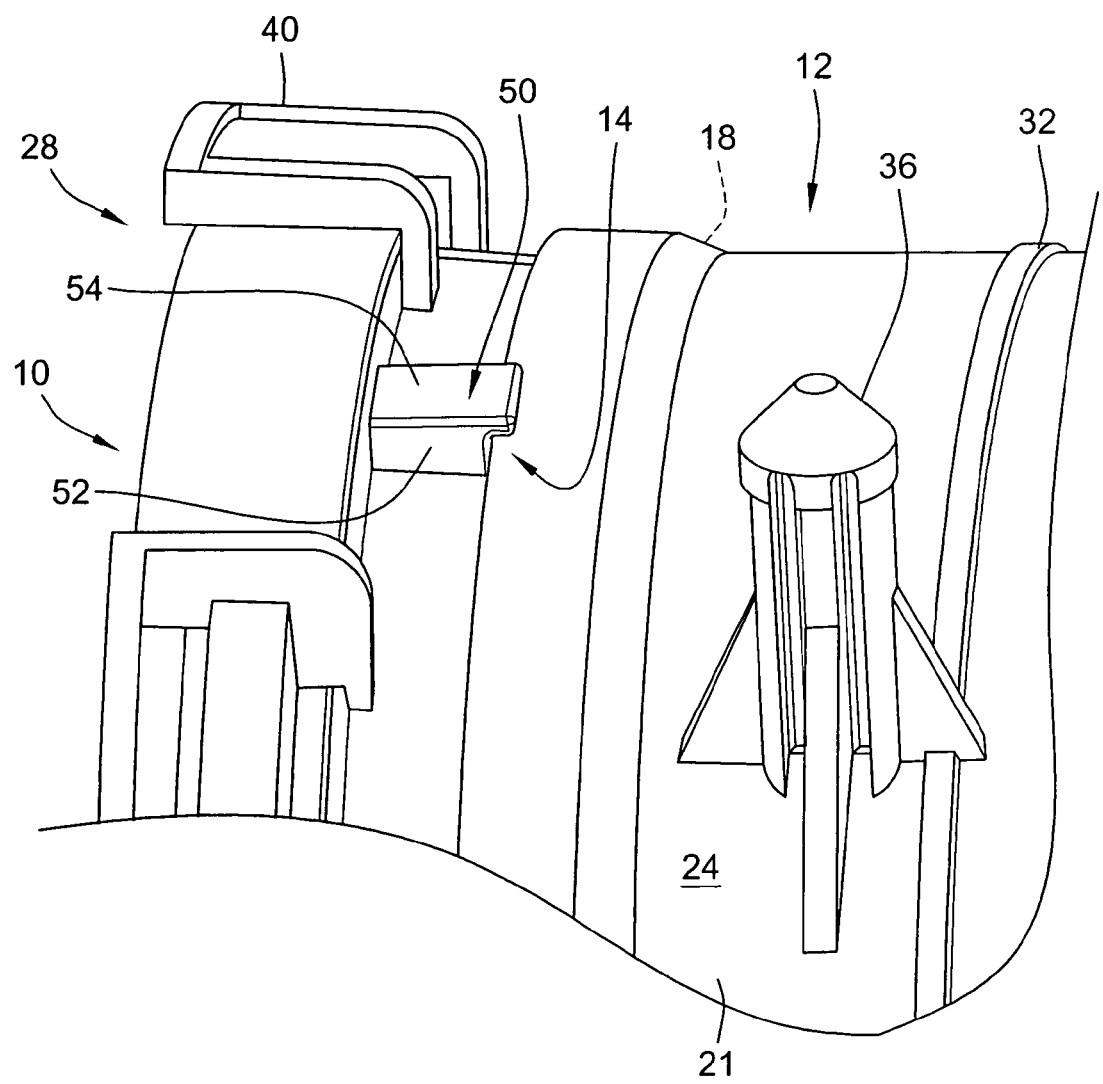
FIG. 4 is a cut away portion of the filter element of FIG. 1 highlighting a moisture release aperture.

The bead of adhesive is however not laid overly thick so as to prevent obstruction of the moisture release aperture 14. The moisture release aperture 14, which is highlighted in FIG. 4, is adapted to permit a fluid (e.g., water) to be expelled from within the filter element 10. As collectively illustrated in FIGS. 4 and 5, the moisture release aperture 14 is preferably covered and/or shrouded by an offset hood 50. The hood 50 may be integrally molded as a structure into the jacket 12, and preferably into the first sleeve 94. The offset hood 50 is generally spaced outwardly from the outer peripheral surface 24 of the jacket 12 by a pair of flanges 52 such that a cover 54 is positioned over the moisture release aperture 14. As such, the moisture release aperture 14 is protectively covered without restricting a flow of fluid therethrough. With the moisture release aperture 14 sheltered in this manner, the fluted filter media 16 within the filter element 10 (FIG. 1) is safe from punctures, tampering, and other damage while still leaving an open flow passage.

The type of filter media 16 installed in the jacket 12 may take different forms, and is preferably of the axial flow type (depth media, fluted media are often axial, and even pleated media can be arranged for axial flow). One of the preferred forms from the standpoint of providing a high filtering capacity is fluted filter media 16 as illustrated. The aforementioned patents illustrate that the methods and constructions of fluted filter media are well known. Therefore, details herein will be relatively limited as additional reference can be had to these prior patent publications for reference. The fluted filter media 16 preferably disposed within filter jacket 12 is illustrated in an uncoiled state in FIG. 6B. As shown, the fluted filter media 16 comprises a planar sheet 56 and a fluted sheet 58 of filter material intermittently bonded together and then coiled up. In a preferred embodiment, one or both of the planar sheet 56 and fluted sheet 58 are made of the same material and can comprise a natural material (e.g., cellulose filter paper) and/or a synthetic material. The fluted sheet 58 can be formed by corrugating or by forming close folds in a sheet filter paper so as to form alternating peaks and valleys.

The fluted filter media 16 can be constructed by in a variety of different ways (e.g. such as with or without a winding board). In one example, as collectively and progressively illustrated in FIGS. 6A-6C, a stitch adhesive 60 is intermittently centrally placed between the planar sheet 56 and fluted sheet 58 while another adhesive 62 (such as urethane) is preferably continuously placed proximate edges of the planar sheet and fluted sheet to form an "A" seal 62. These adhesives can be laid as a bead on either the fluted sheet 58 and/or the planar sheet 58 before the two sheets are joined together. Thereafter, the planar sheet 56 and fluted sheet 60 are collectively joined together to sandwich the adhesive material between the two sheets and bond the two sheets together.

After the planar sheet 56 and the fluted sheet 60 are bonded together, more adhesive 66 is placed on a top surface 68 of the fluted sheet 58, preferably somewhat away from the edge of the bonded planar sheet 56 and fluted sheet 58. Once this is done, the fluted filter media can be coiled and rolled up causing the exposed faces of two sheets 56, 58 to contact each other. This adhesive 66 forms the "B" seal when the planar sheet 56 and fluted sheet 58 are collectively rolled up. If desired, in addition to the adhesive 66, further stitch adhesive (not shown) can be placed on an exposed face of either or both the planar sheet 56 and/or the fluted sheet 58 to provide for structure integrity of the rolled pack of fluted filter media 16 and prevent telescoping or other such failure of the fluted filter media when it is subjected to air flow and pressure.

Figure 6A:
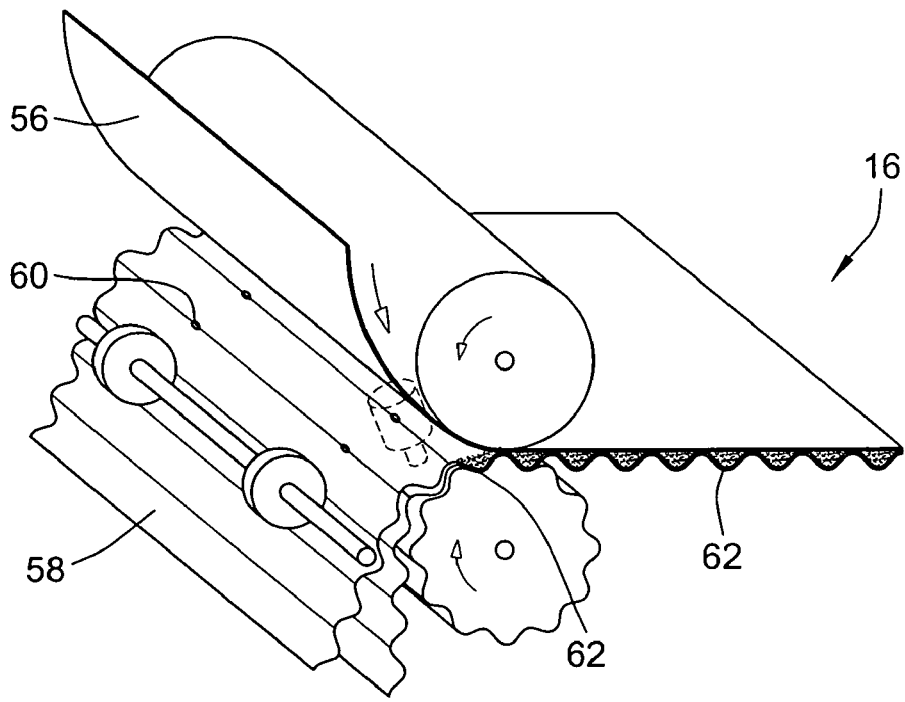
FIG. 6A is a perspective view of the formation of the filter media employed in the filter element of FIG. 1.
Figure 6C:
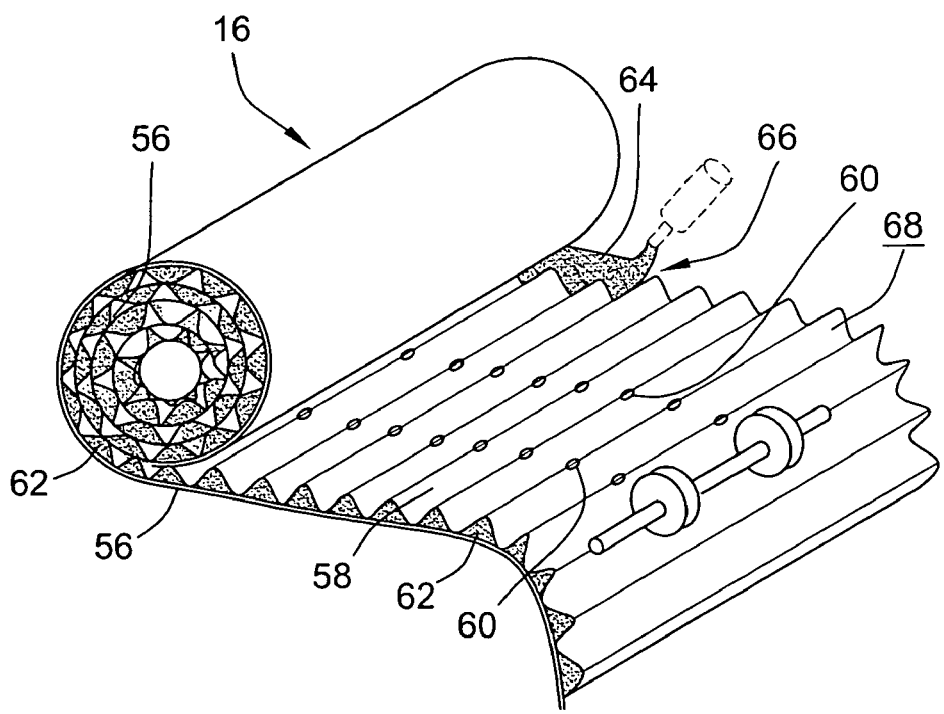
FIG. 6C is a perspective view of the filter media, in partially coiled state, employed in the filter element of FIG. 1.
Figure 6B:
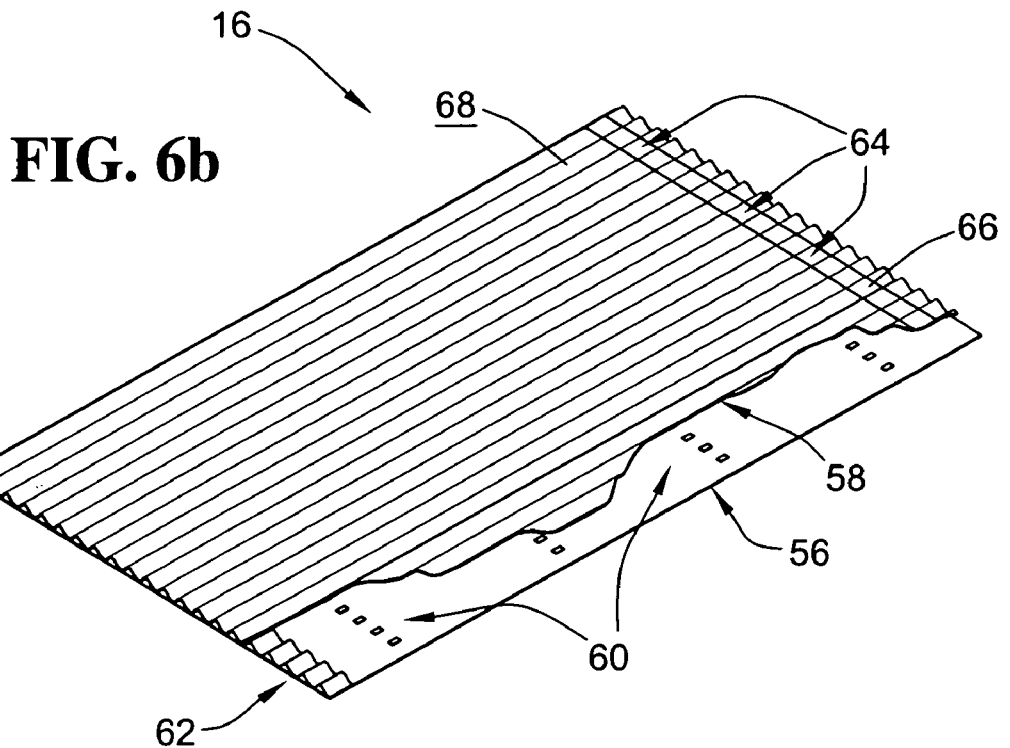
FIG. 6B is a perspective view of the filter media, in an uncoiled state, employed in the filter element of FIG. 1.

With the bonded planar sheet 56 and the fluted sheet 58 collectively coiled and/or wrapped together, fluted filter media 16 having a plurality of flutes 70 (FIG. 1) is formed. One group of flutes in the plurality of flutes 70 is closed proximate the upstream end 28 while another group of flutes in the plurality of flutes is closed proximate the downstream end 30. As described above, preferably the flutes are closed by sealing the flutes shut, however the flutes may also be closed by crushing or other such closure means. Additionally, the closure and sealing location may be located exactly at or somewhat spaced apart from an end of the filter media 16 (typically one seal bead is at the end face while the other one is recessed somewhat as shown in FIGS. 6A-C). Proximate has been used herein to encompass all different potential arrangements and constructions of fluted filter media.

When the fluted filter media 16 is subjected to air flow, the air will flow into the group of flutes 70 which are opened at the inlet face. As these flutes 70 are closed proximate the outlet face, air is forced through the filter paper and into flutes 70 that are open at the outlet face (and closed proximate the inlet face) to exit the filter media pack. As such, any contaminated air flowing through the fluted filter media 16 from the upstream end 28 to the downstream end 30 is forced through the fluted filter media and, therefore, cleaned with particulates and contaminants being trapped along the walls of the open inlet flutes.

The internal seal 18 is generally disposed inside the filter jacket 12 between the upstream end 28 and the downstream end 30. In a preferred embodiment, the internal seal 18 is circumferential and disposed closest to the upstream end 28 (FIG. 1). As depicted in FIG. 7, which illustrates a cross section of the filter jacket 12 taken about the internal seal 18, the internal seal is interposed between and sealingly engages each of the filter jacket inner surface 22 and a filter media outer surface 72.

As shown in FIG. 1, the external seal 20 is a generally oval shaped, preferably compressible, seal material secured to a portion of the filter jacket 12 proximate the downstream end 30. The external seal 20 and the internal seal 18 are in spaced relation to each other and the fluted filter media 16 is disposed within and surrounded by the filter jacket 12.

Figure 8:
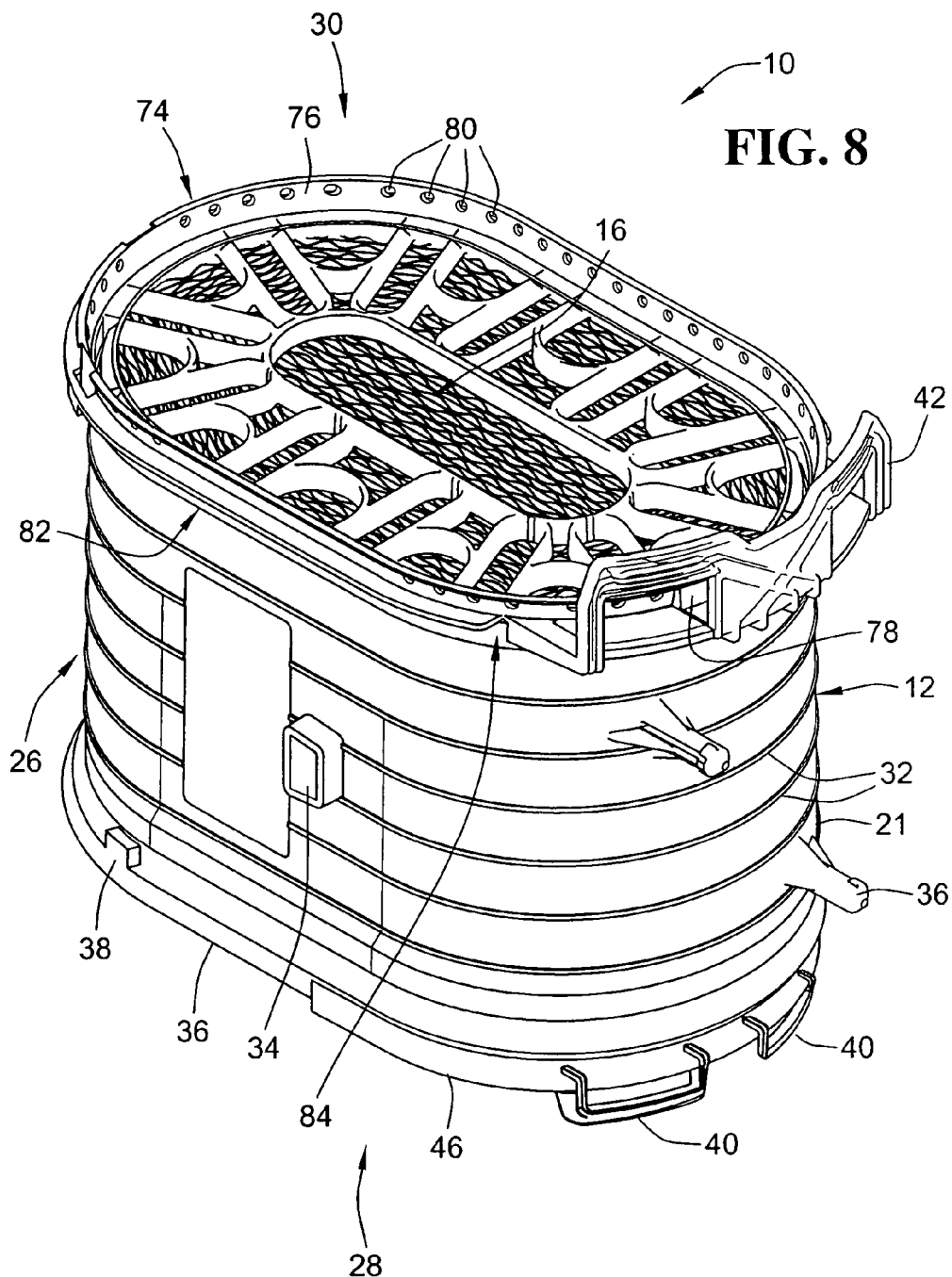
FIG. 8 is a perspective view of the filter element of FIG. 1 with an external seal removed to illustrate an annular seal support member.

While the seal may comprise a preformed gasket or other such form-in-place seal material, the disclosed embodiment utilizes a foamed urethane seal that is molded and directly mounted to the filter jacket 12, and more specifically the second sleeve 96 via an annular seal support member 74. As illustrated in FIG. 8, the external seal 20 has been removed to reveal the annular seal support member 74 that is integrally formed on the filter jacket 12. The annular seal support member 74 is canted relative to the axis and includes differently canted sections to include a radially outwardly canted portion 76 and a radially inwardly canted portion 78. As illustrated, the radially inwardly canted portion 78 is disposed proximate the rib network 42.

The outwardly canted portion 76 includes a plurality of perforations 80 or apertures formed therein. The perforations 80 receive the free-rising seal-forming material (e.g., such as a foaming urethane) that forms the external seal 20. Portions of seal material that project through the perforations 80 lock the external seal 20 to the annular seal support member 74. The seal material is generally permitted to flow around the annular seal support member 74 as well as into and through the perforations 80. When that material stiffens or coagulates, the solidified or hardened material within the perforations 80 locks and/or secures the newly formed external seal 20 to the seal support member 74.

Figure 9:
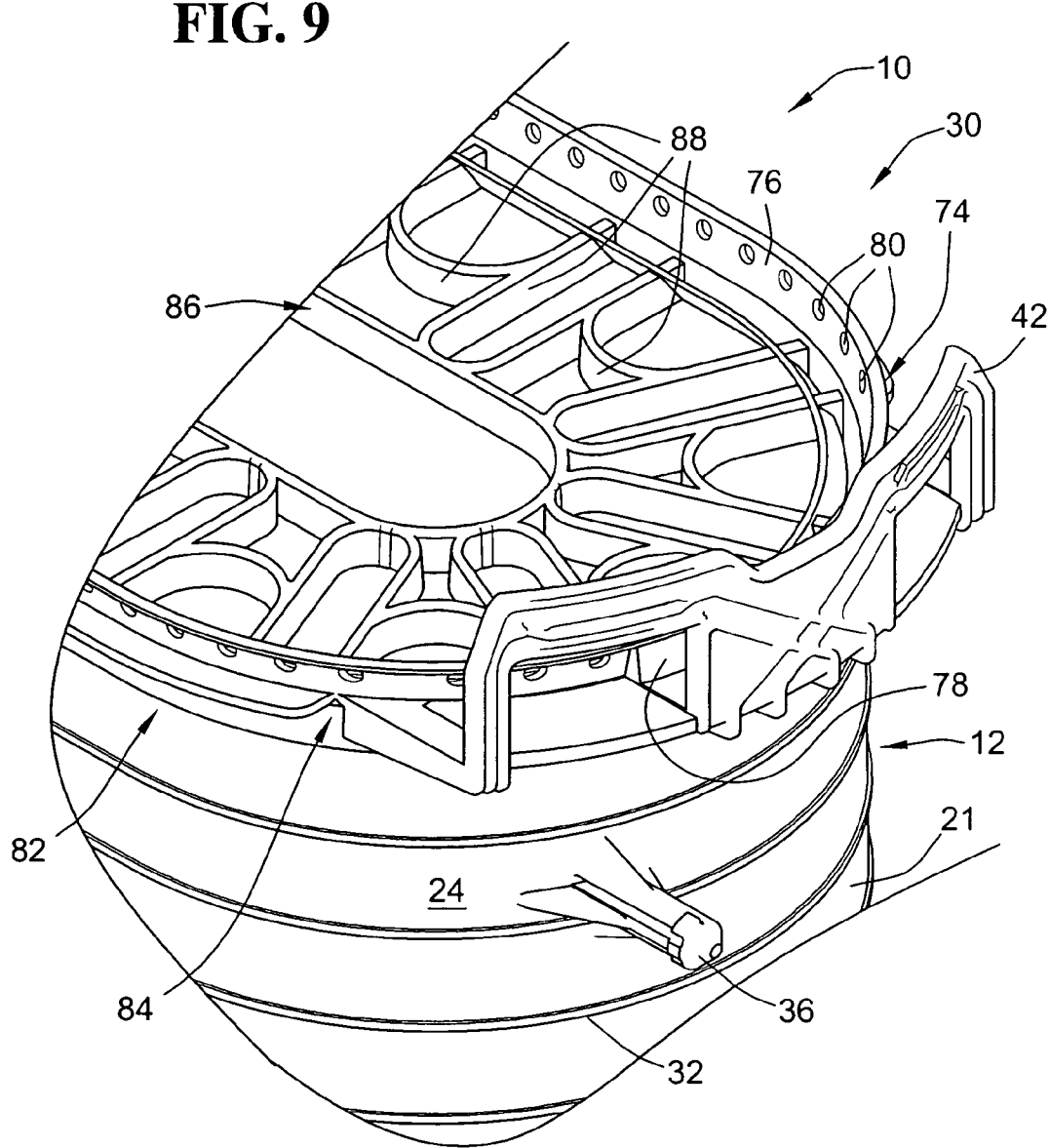
FIG. 9 is a cut away perspective view of the filter element of FIG. 1, with the fluted filter media removed, showing both a discontinuous flange forming an intermittent gap and a rib network.

Referring to both FIGS. 8 and 9, the second sleeve 96 and therefore the jacket 12 also includes a discontinuous flange 82. The discontinuous flange 82 extends radially outwardly from the outer annular wall 21 of the filter jacket 12 proximate the downstream end 30. The discontinuous flange 82 extends generally around the filter jacket 12, but is broken up into separate sections by intermittent gaps 84 in the sealing flange. The sealing flange 82 is utilized during manufacture to provide a cap or boundary for the foam urethane material, which during molding inherently will expand and free-rise. The intermittent gaps 84 permit the free-rising seal material to expand upwardly through the gaps and preferably beyond the sealing flange. By permitting the free-rising seal-forming material to rise at least partially through the gaps 84, proper or desired formation of the external seal 20 can be confirmed by visual inspection. For example, a person can inspect the various gaps 84 to confirm that seal material is at least partially projecting up into the gaps. If material is not foamed up into the gaps, then such an indication can indicate a potential problem with the seal molding process. Another separate benefit of the gaps 84 is that seal material will project up into the gaps thereby locking the external seal 20 to the filter jacket 12 in a location and plane different than the seal support member 74. Yet another potential advantage of the gaps is that they allow for venting of gas formed during the molding process of a foaming type urethane.

Figure 10:
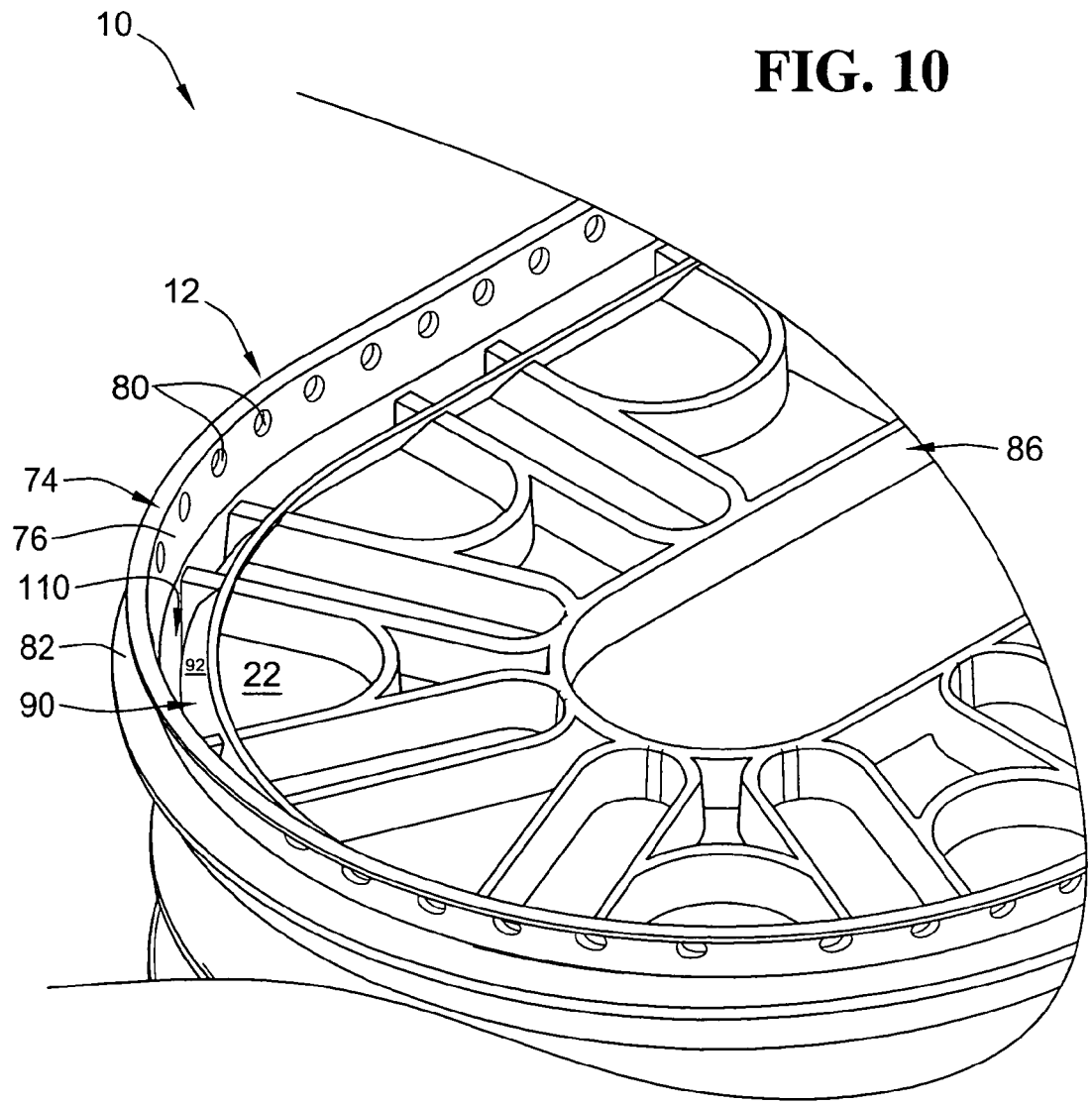
FIG. 10 is a cut away perspective view of the filter element of FIG. 1, with the fluted filter media removed, depicting a baffle.
Figure 11:
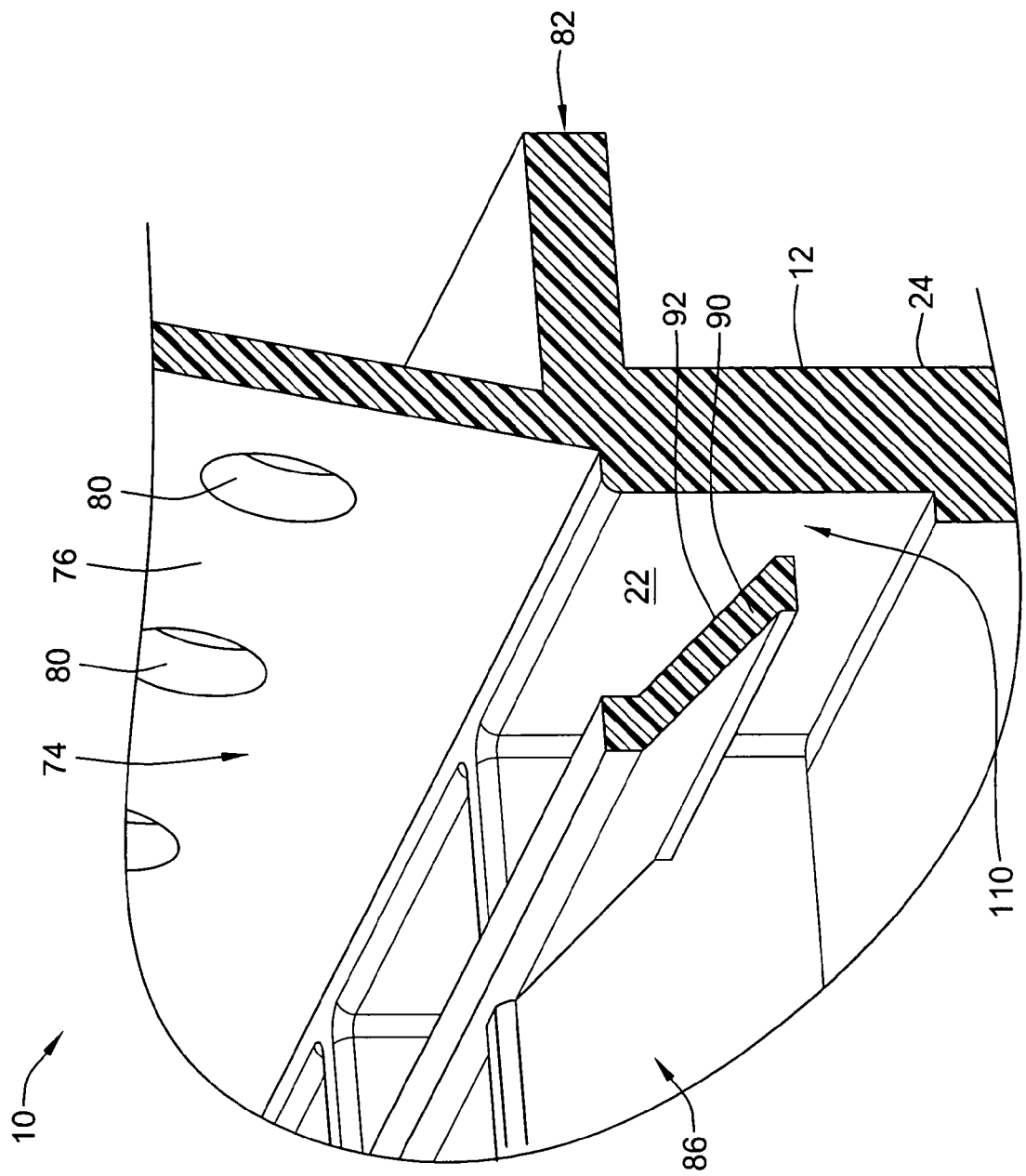
FIG. 11 is a cut away perspective view of the filter element of FIG. 1 illustrating the baffle shown in FIG. 10 from an alternate vantage point.

Moving to FIGS. 10 and 11, the filter jacket 12 further includes a baffle 90 proximate the downstream end 30 which also assists in control over desired seal formation. The baffle 90 is disposed over the outlet face of the fluted filter media 16, with the baffle surface 92 axially spaced from the filter media 16. As shown, the baffle 90 projects radially inwardly from proximate the filter jacket inner surface 22 toward the downstream end 30. The baffle 90 includes a baffle surface 92 that is adapted and arranged to direct a flow of the free-rising seal material when the external seal 20 is formed during the molding process. In particular, the baffle surface 92 faces a free rise surface of the seal-forming material and guides the material during expansion.

Figure 11A:
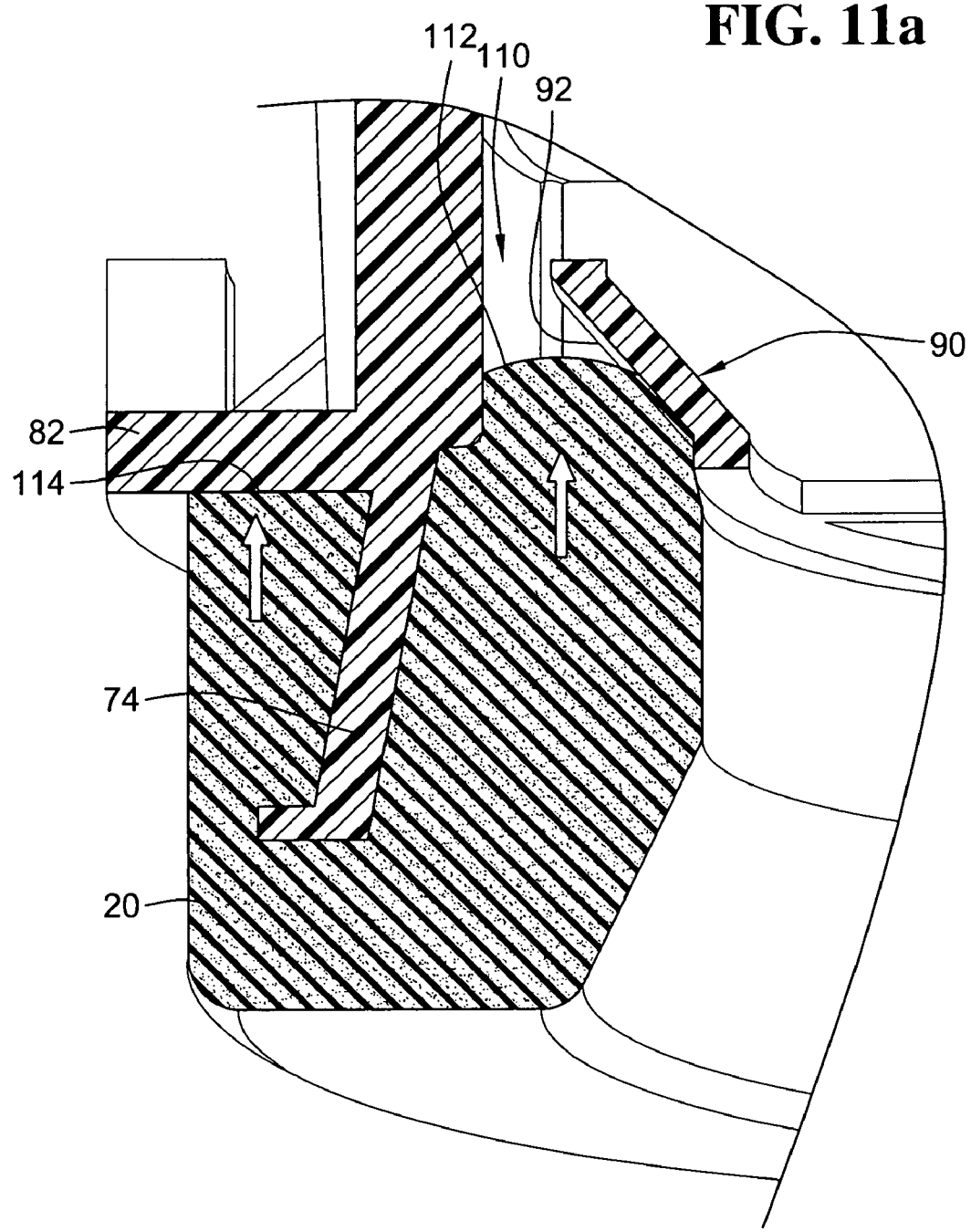
FIG. 11A is a cut away perspective view of the filter element of FIG. 1 illustrating the free rise surface and the molded surface of the external seal.

In the illustrated embodiment, the baffle 90 is proximate the filter jacket inner surface 22 and also radially spaced from the filter jacket inner surface 22 to form an annular free rise expansion area and an annular gas vent 110 therebetween. As shown in both FIGS. 10 and 11, the baffle 90 is spaced by and integrally supported by radially extending ribs of the rib network 86. In the annular expansion area between the baffle 90 and the filter jacket inner surface 22, the seal material is permitted to foam up (as defined by the directional arrows in FIG. 11A) and form an irregular free rise surface 112. In contrast, the remainder of the external seal surface is regular and forms a molded, and thereby controllably shaped, surface 114. This molded surface 114 starts at the discontinuous flange 82 and wraps around the seal support member 74. The inner radial surface of the molded surface 114 is also closely toleranced and shaped to provide for a radial sealing surface that is adapted to form a seal against an appropriate sealing surface of a downstream duct or housing.

In this embodiment, the baffle 90 is arranged to direct the free rise surface 112 radially outward as the free rise surface extends toward the outlet face of the fluted filter media 16. The seal material of the external seal 20 may either contact the baffle 90 or be spaced from it. As the seal material of the external seal 20 rises during the seal molding process, should the seal material engage the baffle surface 92, the seal material is forced radially outward toward the annular vent 110. Thus, the baffle 90 directs the seal material away from fluted filter end face (and minimizes contact with the filter media end face should the free rise surface extend too high), and also maintains the integrity of the sealing surface provided along the inner radial periphery of the molded surface 114.

As also depicted in FIG. 9, the filter jacket 12 includes a web network 86 proximate the downstream end 30 that extends around the end face of the fluted filter media 16 for supporting the filter media (e.g., against air pressure generated during filtration). The web network 86 is adapted to support the fluted filter media 16 within the filter jacket 12 while still permitting fluid to pass. The web network 86 generally includes one or more individual ribs 88.

When installed into an inline duct in a vehicle, the protrusions 38 are aligned with clamps on the duct and the bosses 34, 36 are aligned with mating portions of the housing on the vehicle. This ensures that the gravitational bottom 26 of the filter element 10 where the moisture release aperture 14 is located appropriately positioned with respect to the direction or pull of gravity. Thereafter, each of the protrusions 38 is preferably clamped to the duct and each of the bosses 34, 36 is secured to the housing of the vehicle to fix the position of the filter element 10.

In operation, the filter element 10 receives a flow of contaminated and/or dirty air proximate the upstream end 28. The dirty air enters flutes proximate the upstream end 28, passes through the fluted filter media 16 such that the contaminants are removed from the dirty air, and cleaned or filtered air is expelled at the downstream end 30 by other ones of the flutes. Should any moisture or water enter the filter element 10 upstream of the internal seal 18, the water is able to drain through the moisture release aperture 14. Since the moisture release aperture 14 is preferably positioned to be at or near the gravitational bottom of the filter element 10, gravity is employed to naturally pull or extract the fluid. As such, any water that is found within the filter jacket 12 upstream of the internal seal 18 is permitted to drain or seep out.

After a certain amount of time (i.e., a filter life), the contaminants extracted from the air passing through the filter element cause the filter element to wear out, cause the filter element to loose efficiency, plug the filter element, and the like. When this occurs, the filter element 10 is removed from the inline duct and replaced with a new filter element. Advantageously, the moisture release aperture 14 is thus replaced along with the filter element each time the filter element is replaced. Thus, the moisture release aperture 14 is not prone to clogging or obstructions, due to periodic replacement of the filter element.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element comprising:
   a filter jacket having an outer wall extending between an upstream end and a downstream end, the outer wall defining a filter jacket inner surface;
   a fluted filter media residing within the filter jacket and defining a filter media outer surface, the fluted filter media comprising a plurality of flutes, first selected ones of the plurality of flutes closed proximate the upstream end and second selected ones of the plurality of flutes closed proximate the downstream end; and
   an internal seal formed between the filter jacket inner surface and the filter media outer surface, the internal seal disposed between the upstream end and the downstream end; and
   a moisture release aperture formed through the outer wall of the filter jacket, the moisture release aperture located upstream of the internal seal.

2. The filter element of claim 1, wherein the filter jacket further comprises a hood aligned with the moisture release aperture, the hood protectively covering the moisture release aperture.

3. The filter element of claim 2, wherein the hood comprises flanges and a cover, the flanges projecting radially outwardly from the filter jacket, the cover spaced radially outwardly from the filter jacket and coupled to the flanges.

4. The filter element of claim 1, wherein the filter jacket further comprises a first sleeve and a second sleeve, the first sleeve and the second sleeve coupled together to form the jacket, a material of the internal seal being located at an interface between the first and second sleeves to bond the first and second sleeves together, the first sleeve and the second sleeve being aligned angularly with an alignment notch and an alignment rib on the first sleeve and the second sleeve, respectively or vice versa.

5. The filter element of claim 4, wherein the alignment rib projects only partially into the alignment notch leaving an open gap which forms the moisture release aperture.

6. The filter element of claim 4, wherein the filter jacket further comprises a first sleeve and a second sleeve, the first sleeve and the second sleeve coupled together to form the jacket, a material of the internal seal being located at an interface between the first and second sleeves to bond the first and second sleeves together, wherein the first sleeve is disposed proximate the inlet end and the second sleeve is disposed proximate the outlet end, the moisture release aperture being formed in the first sleeve.

7. The filter element of claim 1, wherein the filter jacket is fluid pervious upstream of the seal through the moisture release aperture and fluid impervious downstream of the seal.

8. The filter element of claim 1, wherein the filter element further comprises an external seal mounted to the filter jacket proximate the downstream end.

9. The filter element of claim 8, wherein an annular seal support member extends from the filter jacket proximate the downstream end and includes a plurality of circumferentially spaced perforations, the perforations adapted to receive and secure a seal-forming material employed to form the external seal.

10. The filter element of claim 1, wherein the filter jacket is formed from a first sleeve having an insertion end and a second sleeve having an outwardly flared receptacle portion, the insertion end telescopically received within the outwardly flared portion.

11. The filter element of claim 1, wherein the filter jacket is formed from plastic and defines means for gravitationally locating the moisture release aperture proximate a gravitational bottom of the filter jacket inner surface.

12. The filter element of claim 1, wherein the filter jacket includes an axially-extending annular wall and a discontinuous flange extending outwardly from the annular wall proximate the downstream end, the sealing flange defining one or more intermittent gaps, an outer seal engaging the sealing flange and at least partially projecting through the one or more intermittent gaps.

13. The filter element of claim 1, wherein the filter jacket includes a baffle proximate the downstream end, the baffle projecting radially inwardly from proximate the filter jacket inner surface toward the downstream end, the baffle facing a free rise surface of a seal-forming material and having a baffle surface arranged to direct a flow of the free rise surface of the seal-forming material surface.

14. A filter element, the filter element comprising:
a filter media adapted to filter fluid passing from an inlet face of the filter media to an outlet face of the filter media;
a sleeve mounted to the filter media, the sleeve including a generally annular seal support member and a discontinuous flange having annular shape and at least one gap formed therein, the discontinuous flange disposed in proximity to the seal support member; and
a seal member comprising seal material formed on the seal support member and having a annular sealing surface adapted to form a seal, the seal engaging the discontinuous flange with a portion projecting at least partially into the at least one gap.

15. The filter element of claim 14 wherein the sleeve comprises an annular wall generally surrounding the filter media, and wherein the discontinuous flange is integrally formed with the annular wall and projects radially outwardly from the annular wall.

16. The filter element of claim 15, wherein the seal material comprises a foam material, the seal material having a mold formed external peripheral surface and an irregular free rise surface, the mold formed external peripheral surface starting at the discontinuous flange and wrapping around the seal support member, the free rise surface disposed radially inward of the seal support member and facing the filter media.

17. The filter element of claim 16, wherein part of the mold formed external peripheral surface provides means for radially sealing inwardly, the means being positioned along the external peripheral surface and facing radially inwardly.

18. The filter element of claim 16, wherein the filter media comprises fluted filter media having a plurality of flutes, first selected ones of the plurality of flutes closed proximate the upstream end and second selected ones of the plurality of flutes closed proximate the downstream end.

19. The filter element of claim 18, wherein the sleeve further includes a generally annular baffle means arranged radially inward of the seal support member and over one of the inlet face and the outlet face for directing the free rise surface radially outwardly as the free rise surface extends toward the filter media.

20. The filter element of claim 15, wherein the gap starts at the annular wall and extends radially outward through the outer radial edge of the discontinuous flange to completely separate different adjacent sections of the discontinuous flange.

21. A filter element, the filter element comprising:
a filter media adapted to filter fluid passing from an inlet face of the filter media to an outlet face of the filter media;
a sleeve mounted to the fluted filter media, the sleeve including a generally annular seal support member and a generally annular baffle having surface means facing the seal support member to direct a free rise of a foamed seal material; and
a seal formed on the seal support member with the foamed seal material, the foamed seal material having a free rise surface proximate the annular baffle.

22. The filter element of claim 21, wherein the filter media comprises a plurality of flutes, first selected ones of the plurality of flutes closed proximate the inlet face and second selected ones of the plurality of flutes closed proximate the outlet face, the filter media providing axial flow of fluid through the filter media, and wherein the seal and the baffle extend around the outlet face.

23. The filter element of claim 22, wherein the baffle is disposed over the outlet face with the surface facing means axially spaced from the outlet face.

24. The filter element of claim 21, wherein the baffle is arranged to direct the free rise surface radially outward as the free rise surface extends toward the outlet face, and further comprising an generally annular gas vent formed between the baffle and a remainder of the sleeve, and wherein radially extending ribs connect the baffle with the remainder of the sleeve.

25. The filter element of claim 21, wherein the filter media provides for axial flow therethrough between upstream and downstream faces, and wherein the sleeve includes an outer wall disposed over an outer periphery of the filter media, the baffle defining a smaller perimeter than the outer wall.

26. The filter element of claim 25, wherein the filter element further includes at least one flange section extending radially outwardly from the outer wall, and wherein the foam seal material has a mold formed external peripheral surface starting at the at least one flange section and wrapping around the seal support member toward the free rise surface, the free rise surface generally contained between the outer wall and the baffle.

27. The filter element of claim 21 wherein the seal support member includes a plurality of openings, and wherein the foamed seal material extends into the openings thereby locking the seal to the sleeve.

28. The filter element of claim 21, wherein the seal material engages the surface means.

* * * * *